Nov. 17, 1936.　　　　E. S. SMITH, JR　　　　2,061,441
METHOD OF AND APPARATUS FOR TELEMETERING
Filed June 11, 1931　　　　5 Sheets-Sheet 1

Inventor
Ed S. Smith Jr.
By Thomas A. Jenckes
Attorney

Nov. 17, 1936.                    E. S. SMITH, JR                    2,061,441
                    METHOD OF AND APPARATUS FOR TELEMETERING
                         Filed June 11, 1931          5 Sheets-Sheet 2

Inventor
Ed S. Smith Jr.
By Thomas A. Jenckes
Attorney

Inventor
Ed S. Smith Jr.
By Thomas A. Jenckes
Attorney

Nov. 17, 1936.  E. S. SMITH, JR  2,061,441
METHOD OF AND APPARATUS FOR TELEMETERING
Filed June 11, 1931  5 Sheets-Sheet 4

Inventor
Ed S. Smith Jr.
By Thomas A. Jenches
Attorney

Nov. 17, 1936.  E. S. SMITH, JR  2,061,441
METHOD OF AND APPARATUS FOR TELEMETERING
Filed June 11, 1931  5 Sheets-Sheet 5

Fig. 9

Inventor
Ed S. Smith Jr.
By Thomas A. Jencks
Attorney

Patented Nov. 17, 1936

2,061,441

UNITED STATES PATENT OFFICE 2,061,441

METHOD OF AND APPARATUS FOR TELEMETERING

Ed S. Smith, Jr., Providence, R. I., assignor to Builders Iron Foundry, Providence, R. I., a corporation of Rhode Island Application June 11, 1931, Serial No. 543,614

36 Claims. (Cl. 177—351)

My invention relates to improvements in metering, particularly at a distance.

An object of my invention is to set up signalling or metering indications in a transmitter through the medium of the versed-sine square-root relationship and to pick up said signalling or metering indications in a receiver, preferably at a distance from said transmitter. My invention is particularly adapted for indicating, preferably electrically, the square root of a quantity.

An object of my invention is to provide a novel type of means and method for transmitting the square root of a quantity, preferably through the medium of the square-root versed sine relationship, by preferably providing a contact line displaceable substantially proportionately to said quantity; a pivotally mounted contact forming member to form a contact with said contact line through an angle of movement of the pivoted member the versed sine of which is proportional to the displacement of said contact line; to set up during the period of contact, preferably by the terminal positions of contact of the contact member and contact line relative to the movement of said pivoted member, instantaneous indications of the square root of the quantity; or, by cyclically or continuously moving the contact member across said contact line, to set up signalling or metering indications each of a time duration substantially proportionate to the angle of movement of said pivoted member during contact with said line and thus proportionate to the square-root of the versed sine thereof and thus substantially proportionate to the square root of said quantity.

It is apparent that the pivoted contact forming member may form a direct contact with the contact line to thus form a direct electrical circuit through said pivoted member and the contact line. Instead, however, the pivoted electric contact former may actuate by its movement, through a pitman and rod reciprocatable in a single plane, or otherwise, a supplemental contact forming means, which separate contact forming means of itself may contact said line for a time interval proportional to the angle that the pivoted member pivots while said contact forming means is so in contact. In any such an arrangement it is obvious that gearing may be interposed between the pivoted member and contact forming member to largely increase its movement relative to that of the pivoted member. It is thus obvious that I am able to provide a novel method of telemetering the square root of a quantity which comprises mechanically transforming a value of said quantity into its square root and telemetrically sending said square root to a receiver and that I preferably do this by transmitting the quantity into the versed sine of the angular movement of a pivoted member and telemetrically transmit said movement of said member to a receiver. My invention also includes the method of continuously telemetering the square root of a quantity which comprises cyclically transforming, mechanically or otherwise, successive values of said quantity into their respective square roots and telemetrically transmitting said square roots to a receiver preferably by cyclically transmitting the angles of movement of a pivoted member in the manner indicated in the previous sentence.

A further object of my invention relates to setting up preferably cyclically a ratio of a value corresponding to a quantity to a total value, preferably by moving a pivoted member through a total angle and moving a supplemental member in response to said quantity into direct or indirect contact with said pivoted member through an angle the versed sine of which is proportional to said quantity, whereby the proportion or ratio between said contact angle and total angle is indicative of said quantity. In one embodiment of my invention a further object is to cyclically set up said ratios and continuously average said cyclic ratios to indicate continuously said average quantity.

The use of an electric contact with a line buzzer, telephone receiver, or magnet operating some indicating device is an extremely sensitive method of determining the condition of an electric circuit with high accuracy and I may employ any one of these types of receivers as the receiving element of my metering system.

A further object of my invention is to form the contact for the transmitter of my invention through a conducting, preferably liquid, medium. An electric current is set up in the receiver relative to the time interval that the cyclically movable or continuously rotatable contact with member is in contact or forms contact through said conducting medium to form a contact through the contact former and conducting medium of a time interval proportionate to the angle during which the contactor actuated by said movable contact former is in contact with said conducting medium. Where there is an electric connection between the transmitter and receiver of my invention this forms an extremely sensitive method of telemetrically determining the position of the liquid mercury surface with high accuracy. If a contact is merely formed through a contact line, such as the edge of a conducting medium by a pivoted contact former, it will indicate directly if desired substantially in accordance with the square root of the quantity depending on the versed sine of the relative angle of contact between said pivoted contactor and contacted line and thus, where a contact is formed between the terminals of said angles of contact, this angle may indicate at any particular instant the square root of a quantity.

If desired suitable means may be provided as shown in my Patent Number 2,003,839 on Apparatus for metering through the medium of the versed sine, to affect the movement of the contact line to make the angle of movement of the pivoted member during contact substantially proportional to the square root of a quantity at all times.

While this type of electric contact may be provided for indicating at any particular time the square root of a quantity, it is particularly adapted for telemetrically continuously cyclically indicating the square root of said quantity. If the pivoted contact forming member is cyclically moved relative to said contact line or other movable member, or is continuously rotated, preferably at constant speed, an electric circuit is formed by said rotated contact element, thus forming the transmitting element of my improved telemeter. It is obvious that electric currents will be set up in the transmitting electric circuit each of a time duration which varies substantially proportionally as the square-root of the versed sine of the angle of movement of the pivoted member and hence the square root of said quantity, and it is to this continuous method of signalling that my invention particularly relates. The variations in the square root of a quantity are thus cyclically sent out by the transmitter of my improved electrical device and may be picked up to actuate the receiving element of the telemetric device relative to the time duration of the periodic currents set up in the transmitter. My invention is particularly adapted for metering the rate of flow of fluid in a conduit, which rate varies from time to time. The height of the contact line or movable contact member is made to vary in proportion to the rate of flow and then by turning the pivoted contact former or rotating it at a constant speed the duration of contact is made directly proportional to the rate of flow or the quantity to be metered. It is obvious that this time duration of contact, whether it be for the rate of flow of fluid in the conduit or any other quantity, may be carried to any distance by means of two wires, or if desired they may be transmitted by radio without any wires at all, my idea broadly consisting of transmitting through a versed sine actuated transmitter to a receiver located at any desired distance from the transmitter.

A further object of my invention is to provide a telemetric transmitting and receiving device by which a quantity may be transmitted to any distance through the medium of two wires at most.

A further object of my invention is to provide in a telemetric system a transmitter having a continuously movable, preferably rotatable, element and an element movable relative thereto in response to a quantity and a receiver having a continuously movable element moving in synchronism with the continuously movable element of the transmitter and means to bring an indicating element into contact with said movable element in response to changes in the electric circuit formed by contact between the movable and rotatable elements of the transmitter. The continuously rotatable, or movable, elements in the transmitter and receiver preferably move at a constant speed and preferably move in synchronism and may consist of time controlled elements such as clocks which move substantially in synchronism in widely divergent places or may also consist of self-starting synchronous motors or clocks actuated by the same source of current which forms the main electric circuit of the telemetric device. Other types of fluid meters in the market depend on having extremely feeble portions, currents or other things balanced against each other and the rate is by no means well defined by the time it reaches its destination. Employing my method, however, the transmitter and receiver of my invention are in time controlled synchronism no matter how many miles they are spaced apart. In an embodiment of my invention I may connect the transmitter and receiver of my invention by two wires having an alternating current therein with a certain number of cycles per second which according to present day practice is uniform over a whole section of the country with modern superpower hook-ups. For example, at the present moment in the country from Washington, D. C. to the northern part of Maine all stations have identical frequency of alternating current. Consequently by using small motors with small synchronous clocks it is then only necessary to carry the time duration by means of two wires from one point to another. Most other systems on the market require three to five wires between the receiver and transmitter. Employing an alternating current, it is obvious that the voltage may be reduced by means of a transformer to avoid break-down effects in the dielectric about the contact former or, if desired, to cut down the current flowing to actuate the receiver so as to cut down the deleterious effects in the contact point and mercury surface when making or breaking the current in the receiver. I may so design my improved metering device to provide a self-contained meter in which the rotating, or constantly moving, elements of both the receiver and transmitter may rotate at constant speed and be revolved by a unitary shaft means. This self-contained type of meter has an analogy with the familiar watt meter used as in metering electric power to small consumers and in its extreme simplicity, ease of setting and low cost should open up an entirely new field for metering small lines which otherwise could not be economically metered.

A further object of my invention is to provide a novel method of telemetering in a telemetering device which consists of cyclically setting up a ratio of a value, corresponding to a quantity, to a total value and continuously averaging said cyclic ratios to indicate said quantity. So far as I am aware, the idea of continuously averaging cyclic ratios to indicate a quantity is new and, although a meter of this type might be somewhat affected by voltage variation, the averaging means for the cyclic ratios could readily be provided to give an average ratio despite the voltage variation. It is thus obvious that my invention in a broader aspect includes cyclically setting up successive values corresponding to a quantity, transmitting said values to a receiver and continuously averaging said transmitted successive values to continuously indicate said quantity. Further features of my invention relate to the novel type of averaging means I employ in the receiver namely, means thermally responsive to said transmitted electric values to continuously average them.

A further object of my invention is to provide a specific type of metering apparatus of the general type described, but particularly adapted for metering petroleum gas, liquids such as anhydrous ammonia or other fluids by forming a contact through a movable solid surface having a contact edge, thus avoiding making electrical contacts within the fluid containing system.

The square root of any quantity may be telemetered by my improved method and device whether it comprises the rate of flow of fluid from a conduit or if desired, as shown in one of my embodiments, I may so modify my device as to enable it to continuously accurately indicate the square root of a pressure.

A further object of my invention is to provide a telemetrically operated receiver which may function at quite a distance from the transmitter and which is provided with light means which flashes off when the indicator comes up to the actual quantity leaving the then quantity engraved on the retina of the observer's eye so that its reading with a high accuracy is an extremely simple matter.

Figure 1:
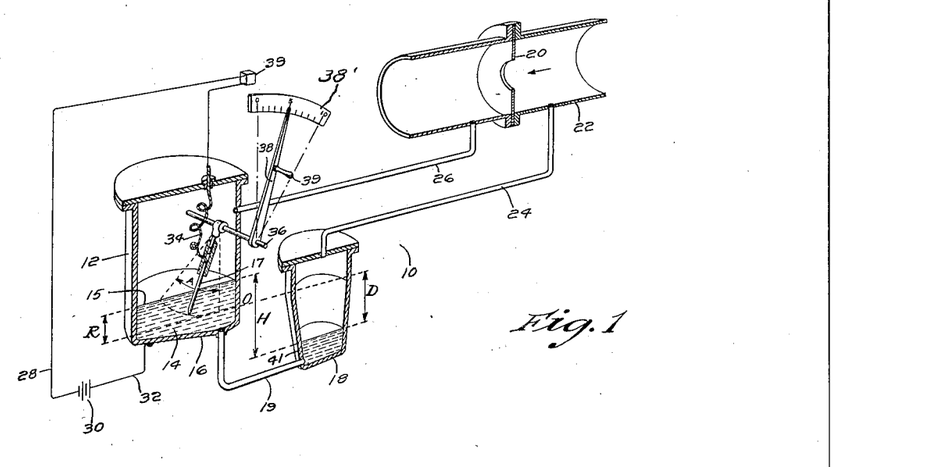
Fig. 1 is a diagrammatic perspective view, partially shown in section, of an embodiment of my invention adapted to continuously indicate instantaneous values of the square root of a quantity by the terminal portions of contact of a pivoted contact-forming member of a transmitter with a member of the transmitter movable in proportion to variations in the quantity.
Figure 4:
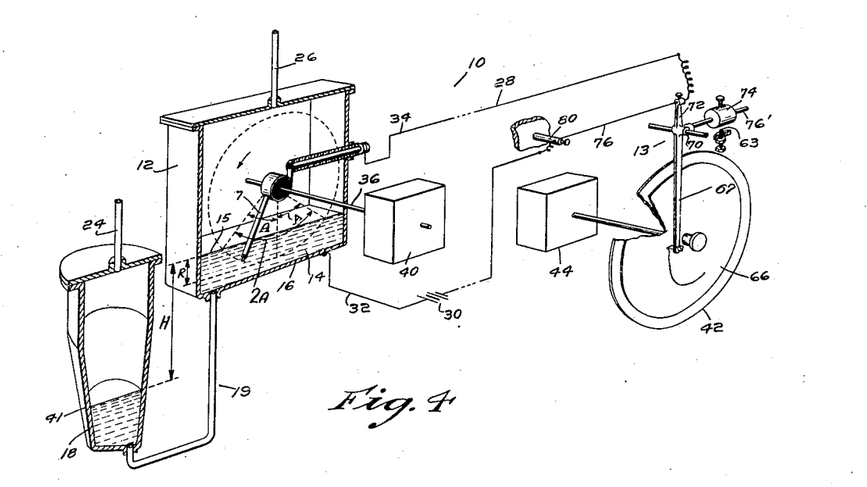
Fig. 4 is a perspective view, partially shown in section, of a telemeter having a transmitter which functions upon the versed sine principle to set up cyclic currents of a time duration varying in accordance with the versed-sine square-root relationship between the angle of contact formed between a movable pivoted member and a member movable in response to variations in the quantity, and a receiver which includes means for averaging the cyclic current impulses received from the transmitter to continuously record a substantially uniform indication of the square root of the quantity metered.
Figure 8:
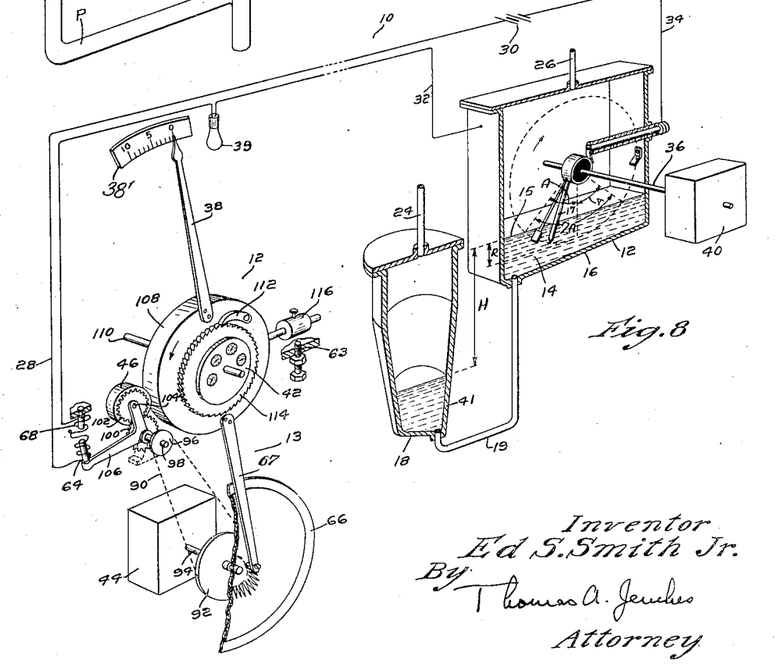
Fig. 8 is a perspective view partially shown in section of a telemetric device having a transmitter generally identical to that shown in Fig. 2, but with a receiver comprising a combination indicator, register and recorder which records the instantaneous value of the terminal positions of contact of the relatively movable members of the transmitter and also employs a radially sweeping type of recorder which makes radial sweeps across the rotating recording surface, the displacement of said sweeps corresponding to the time durations of the electric impulses set up in the transmitter.

A further object of my invention is to provide any type of indicating means for my improved receiver, whether an actual indicator as shown in Fig. 1, a recorder as shown in Fig. 4 or 8, and the combination of an indicator integrator recorder shown in Fig. 8. A further object of my invention is to provide an improved telemetric recorder in which the accuracy of the chart record in no way depends on the frequency of the cycles so long as the same frequency exists at the transmitter and receiver.

These and such other objects of my invention as may hereinafter appear will be best understood from a description of the accompanying drawings, which illustrate various embodiments thereof.

In the drawings.

In the drawings, wherein like characters of reference indicate like parts throughout, 10 generally indicates a telemetric device constructed in accordance with my invention.

In Fig. 1 I have shown such a device particularly adapted to indicate instantaneous values of the rate of flow of fluid in a conduit. In all the embodiments of my invention, my invention includes a transmitter 12, including a contact forming means 14 movable in response to variations in a quantity. In Fig. 1, said contact forming means includes a conducting liquid 14, such as mercury, which is contained in the legs 16 and 18 of U-tube 19. The embodiment shown in Fig. 1 is adapted to indicate the rate of flow of fluid in a conduit by means of a pressure differential producer such as the orifice plate 20 shown interposed in the pipe 22. A pipe 24 connects the high pressure side of the pressure differential producer to the high pressure leg 18 of the differential responsive U-tube 19 and a pipe 26 connects the low pressure side of the differential producer 20 to the low pressure leg 16 of the U-tube 19. The upper surface of the conducting liquid 14 forms the contact line 15 which is thus movable a distance R in response to the pressure differential H, or as the square of the rate of flow of fluid in the conduit 22. It is obvious that the manometric liquid's rise R in one well plus its drop D in the other equals the pressure differential H. The electric circuit 28 provided with a suitable source of power 30 has one terminal 32 thereof connected to said conducting liquid 14 having surface 15 through the bottom of the leg 16 of the U-tube. The other element of the transmitter 12 of my improved electrical device, comprises a contact forming member 17 connected with said circuit 28 by means of the terminal wire 34 and pivotally mounted such as on the shaft 36 to contact said contact line 15 of the upper surface of said conducting liquid 14 through an angle A the versed sine of which is proportional to the displacement R of said contact line. The pivotal contactor 17 and contact line 15 form respectively the transmitting elements of the transmitter of my improved device. The contact line 15 of the conducting liquid 14 forms contact means movable in response to variations in a quantity H and the contactor 17 forms a rotatable contact-forming member movable into contact with said movable means. It is thus obvious that the pivoted contactor 17 may be moved into contact with the contact line 15 through an angle A formed by the pivoted member the versed sine of which is proportional to said quantity H.

In the embodiment shown in Fig. 1, the receiver of my invention comprises the electric light or buzzer 39 interposed in the telemetric circuit 28 and adapted to indicate when there is contact between the pivoted member 17 and the contact line 15. In said embodiment the indicating means comprises the member 38 attached to the shaft 36 on which the pivoted contact member 17 is mounted so as to pivot through the angle A. In the embodiment shown in Fig. 1 the contactor 17 is pivoted through an angle from a position perpendicular to the contact line 15 to a position out of contact with the contact line 15, the indicator 38 moving over the scale 38' an amount proportionate to the angle A through which the contact member 17 is pivoted, the versed sine of the angle A being proportionate to the displacement R of said contact line.

In the operation of the device shown in Fig. 1 the U-tube is so connected to the differential producer 20 that when there is zero flow through the conduit 22 the surface of the conducting liquid 14 in the leg 16 will be at a terminal position O just barely below the end of the then vertical pivoted contactor 17. As the rate of flow through the conduit increases it is obvious that the contact line 15 or the upper surface of the conducting liquid will rise in the leg 16. By means of the handle 39 for the contact arm 38 and connected pivoted contactor 17, it is then obvious that the pointer 38 may be moved across the scale 38' and the pivoted contact arm 17 correspondingly raised until it just breaks contact with the contact line 15. At that instant, the light 39 will go out and the exact position of the contact arm 38 on the scale 38' may be engraved on the retina, the position of the pointer 38 on the scale 38' then indicating the instantaneous rate of flow through the conduit 20. It is apparent therefore that, due to the versed-sine square-root relationship, the pointer 38 will approximately indicate the square root of the pressure differential formed by the rate of flow. In order that the movement of the contact arm 17 and pointer 38 may be accurate in accordance with the square root I provide means to modify the movement of the contact arm 17 and pointer 38 in exact accordance with the versed-sine square-root relationship and to this end I taper the lower portion of the leg 16 of the U-tube as at 41 so that the pointer 38 and contact arm 17 may pivot through an angle A exactly proportional to the square root of the differential H and thus indicate directly the rate of flow.

As shown in all other embodiments of my invention, my invention is particularly adapted for continuously telemetering or otherwise metering at a distance the square root of a quantity. In the embodiment shown in Fig. 2 the transmitting elements of my invention, namely, the pivoted contact member 17 and the contact line 15 or movable contact means 14, remain substantially the same, an electric circuit being formed between the contact line and the pivoted contact member by the respective connections 34 and 32 to the electric circuit 28. In this embodiment I provide means 40 to rotate said pivoted contactor 17 relative to said contact line 15 to set up periodic currents in said circuit 28 whose time duration varies as the angle 2A of contact between said pivoted contact member 17 and contact line 15. The means 40 continuously moves said rotatable or pivoted contact member, either by oscillation or continuous rotation at a constant speed or otherwise, into and out of contact with the contact line 15 or surface 15. It is obvious by employing this transmitter 12 that flows of current are set up in the electric circuit 28 of a time duration corresponding with the displacement R of said contact line 15 and proportional to the angle 2A of contact of said pivoted member 17 and contact line 15, the versed sine of angle A of contact being thus proportional to the displacement R of said contact line 15. It is thus obvious that the means 40 continuously rotates said rotatable contact member 17 into contact with said movable contact member 15 through an angle 2A, the versed sine of A being proportional to the displacement R of the movable contact member 15, to set up signal indications of a time duration proportionate to said angle of contact 2A. It is also obvious that said transmitter 12 functions to move the pivoted member 17 through a total angle, in this instance one of 360°, and set up signalling indications by moving a supplemental means such as the contact line 15 in response to the quantity to be metered into contact with said pivoted member 17 through an angle 2A, the versed sine of A being proportional to said quantity, whereby the proportion between said contact angle and total angle is indicative of said quantity.

Figure 2:
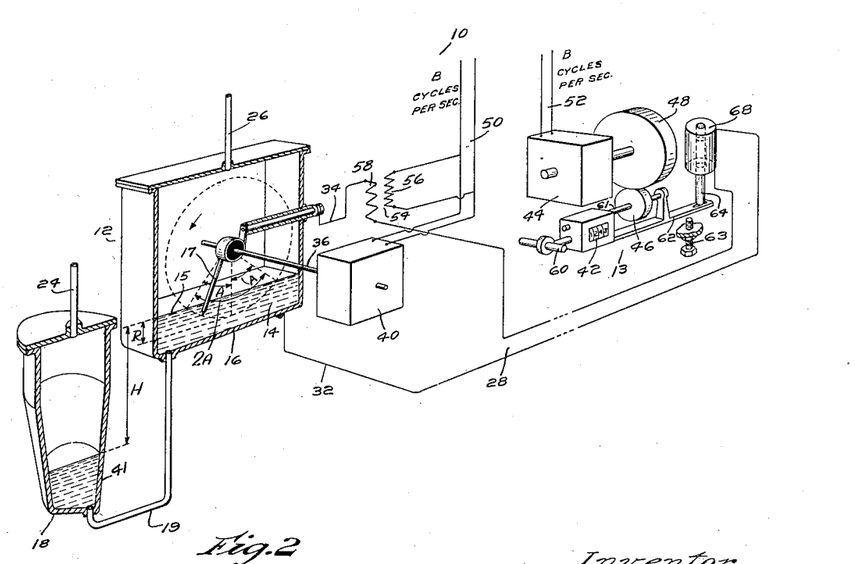
Fig. 2 is a diagrammatic perspective view, also partially shown in section, of a completely telemetric embodiment of my invention adapted to telemetrically transmit to a distant receiver electric currents which vary in time duration with the angle of contact formed between a continuously rotating contact member and a contact member movable in response to changes in rate of flow of fluid in a conduit.

All embodiments of the receivers for the time interval telemetric embodiment of my invention 13 are substantially the same. Said receiver 13 includes movable indicating means such as the counter 42, means 44 rotating preferably continuously and preferably in synchronism with said contactor rotating means 40 and preferably at constant speed, and clutch means 46 electrically actuated in response to periodic flows of current in said circuit to engage said movable indicating means 42 with said continuously rotating means 44 for periods corresponding with the time duration of the periodic currents set up in the transmitting circuit 28 by the transmitter 12 in the manner hitherto explained. The particular embodiment of my invention shown in Fig. 2 is adapted to transmit time intervals which vary as the angle of contact between the relatively movable members of the transmitter to a distant receiver. For these purposes I preferably provide time controlled means such as the clocks 40 and 44 to continuously revolve the pivoted member 17 and the movable driving member 48 of the clutch respectively in synchronism.

In the embodiment shown in Fig. 2, I provide synchronous motor clocks adapted to be actuated by an alternating current. As stated, it is possible to obtain alternating current with the same number of cycles at widely separated points and since alternating current of the same or a constant frequency exists at widely separated points, it is possible to run the synchronous motor clocks 44 and 40 in synchronism by different sources of alternating current at a considerable distance.

The telemetric circuit 28, however, preferably consists of a single circuit. In the embodiment shown in Fig. 2, I have provided the circuit 50 for driving the transmitting synchronous motor clock 40 and the circuit 52 of alternating current of the same number of cycles as the circuit 50 for driving the synchronous motor clock 44. The primary 56 of the transformer 54 is connected to the circuit 50 which in turn induces an alternating secondary current into the circuit 28 of lesser voltage through the secondary coil 58 of the transformer 54 connected to said electric circuit 28 which induces the desired current in the circuit 28 to carry the flows of current from the transmitter 12 to the receiver 13 of my improved telemetric device.

In the embodiment shown in Fig. 2, the counter 42 or movable indicating means of whatever type employed is pivotally mounted on the shaft 60. Said counter has in turn driving means 46 therefor also mounted on the driving shaft 61 thereof. The free end of the counter supporting bracket 62 has mounted thereon a rod 64 forming a core of solenoid 68. The latter in turn is directly connected to the electric circuit 28. It is therefore obvious that when a flow of current is set up in the electric circuit 28 by medium of the transmitter 12 that the solenoid 68 connected thereto will be electrically energized to raise up the rod 64 to raise up the bracket 62 to bring the driving member 46 for the indicating means 42 into contact with the driving shaft 48 therefor rotated at constant speed by the clock 44; and that when the transmitter has stopped transmitting its indications or currents, which vary in response to the angles of contact between the contact line 15 and contactor 17, that the solenoid 66 will de-energize to permit the clutch driven member 46 and counter 42 to drop to an in-operative position. It is obvious, however, that the electrical clutch or armature 66 may be so designed as to bring the relative rotatable members 46 and 48 for the indicating means 42 into contact during the period when the circuit 28 is either energized or deenergized. In place of the counter 42, however, any suitable type of indicating means may be provided.

It is apparent that in this instance the electric circuit 28 consists of only two wires or may of course consist of a radio connection without any wires at all and it is obvious that the device functions to convert the rate of flow through the versed sine means functioning transmitter 12 to the receiver 13 through the medium of the two wires only of the circuit 28. It is obvious that due to the transformer 54 the flow of current through the circuit 28 need not be very great, but that the contact forming device or the transmitter functions with a minimum of sparking and a strong terminal position cut off to transmit to the receiver 13.

Other types of telemeters have all depended upon extremely feeble portions, current or otherwise, balanced against each other and the terminal portions of the time interval of current transmitted are by no means well defined when they reach their destination. The method employed in Fig. 2 is good over any number of miles and, as stated, as it is possible to obtain alternating current of a uniform number of cycles over a whole section with modern super-power hook-up it is obvious that the synchronous motor clocks 40 and 44 will function to drive the rotatable members 17 of the transmitter and 48 of the receiver in synchronism no matter at what distance apart. Thus it is possible by using small synchronous motors for the clocks to accurately carry the time duration signalling indications by means of only two wires in the circuit 28 from one distant point to the other. Most of the systems hitherto on the market have required from three to five wires between the receiver and transmitter. By employing an alternating current it is obvious that the voltage in the circuit 28 may be either reduced by means of the transformer 54 to avoid break down effects in the dielectric or may if desired to cut down the current flowing to actuate the receiver be so reduced as to cut down the deleterious effects in the contact point and mercury surface upon making or breaking the circuit.

Figure 3:
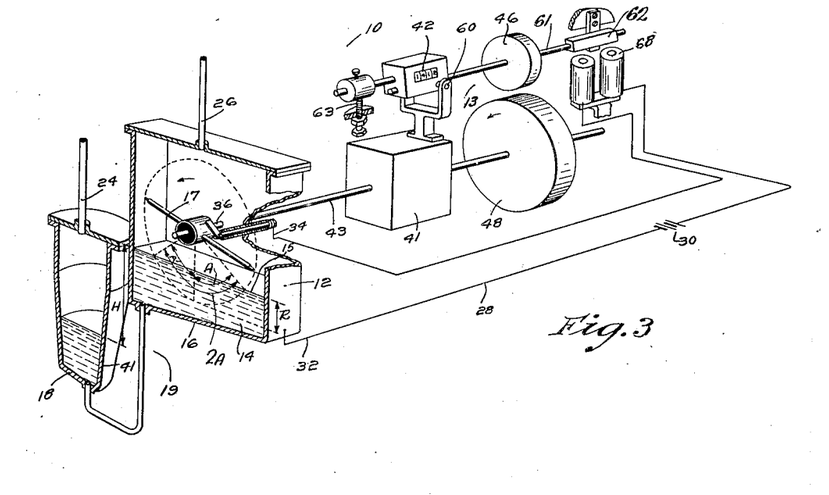
Fig. 3 is a perspective view, partially shown in section, generally similar to Fig. 2, of a self-contained unit in which the movable members of the receiver and transmitter are rotated at synchronous speed by a single clock means.

Fig. 3 illustrates a self-contained type of meter which offers the promise of being the cheapest possible accurate integrating meter. This meter is identical in its functioning to that shown in Fig. 2 with the exception that it is adapted to be all located at one place and to have the rotatable means 48 of the receiver and the rotatable member 17 of the transmitter rotated by a unitary clock motor 41 which preferably drives the unitary shaft 43 on opposite ends of which the rotatable member 17 of the transmitter and the rotatable member 48 of the receiver are mounted. In embodiments shown in Fig. 2 or 3, it is obvious that means such as the screw 63 may be provided to adjust the limit of the dropping of the bracket 62. The self-contained type of meter shown in Fig. 3 corresponds with the familiar watt meter used in metering power to small consumers and its extreme simplicity, ease of setting and low cost should open up an entirely new field in small lines which otherwise could not be economically metered.

The embodiment in Fig. 4 is generally similar to the embodiment shown in Fig. 2 employing, however, as the indicating means 42 thereof, a simple chart recorder 42 used in connection with the same electric versed-sine time-duration contact transmitter. This device involves a new principle in telemetering which comprises cyclically setting up a ration of a value corresponding to a quantity to a total value and continuously averaging in a receiver said cyclic ratios to indicate said quantity. The ratio is set up by the transmitter 12 of the device exactly similar to Fig. 2, the ratio being that of the angle of contact between the rotating member 17 and the contact line 15 to the complete revolution of 360° of the total value of the movable member. This ratio is continuously transmitted through the circuit 28 of the receiver 13. In this embodiment the rotatable member 44 continuously rotates the recording chart 66. The pen arm 67 is pivotally mounted on a shaft 70 and has a power arm 72 projecting therefrom. Said indicating arm also has a weight 74 mounted on an arm 76' thereof adapted to abut the adjustable stop 63. As stated, this embodiment includes means for continuously averaging said cyclic ratios to indicate said quantity. Said means preferably comprises the hot wire 76 which stretches in length according to the duration of the cyclic currents set up in the circuit 28 by medium of the transmitter 12. One end of this hot wire is connected to the fixed terminal 80 and the other end thereof is connected to the power arm 72 of the indicating arm 67. It is thus obvious that when current flows through the hot wire 76 connected to the circuit 28 the hot wire 76 will stretch, thus allowing weight 74 to force the recording arm 67 radially outwards relative to the center of the rotating chart 66. When the current is cut off from the circuit 28 the hot wire 76 will tend to contract but on re-establishment of the current through the circuit 28 the wire 76 will then tend to stretch again. As currents are cyclically sent through the receiver 13 it is obvious that the expansion of the hot wire 76 will vary in response to the means or average of the aforesaid cyclic ratios of said time intervals of electric contact in the circuit 28 including the wire 76 so that the radial position of the pen arm 67 will continuously average said cyclic ratios and indicate the mean ratio on said revolving chart 66. Where the transmitter 12 functions on the versed-sine principle heretofore explained, the receiver will thus operate to function in accordance with the versed-sine relationship hitherto explained. If desired the receiving unit shown in Fig. 4 may be mounted with and actuated directly by the transmitter of the circuit, thereby forming a continuous recorder at a relatively small expense.

Figure 5:
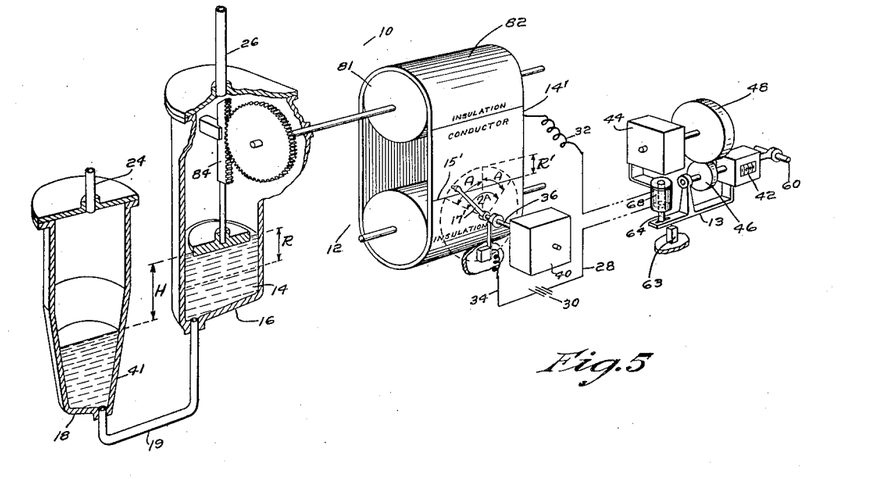
Fig. 5 shows an embodiment of my invention, generally similar to Fig. 2, particularly adapted for metering gas or other fluid, and having a non-liquid contact with a contact line consisting of the edge of a plane solid contact movable surface.
Figure 6:
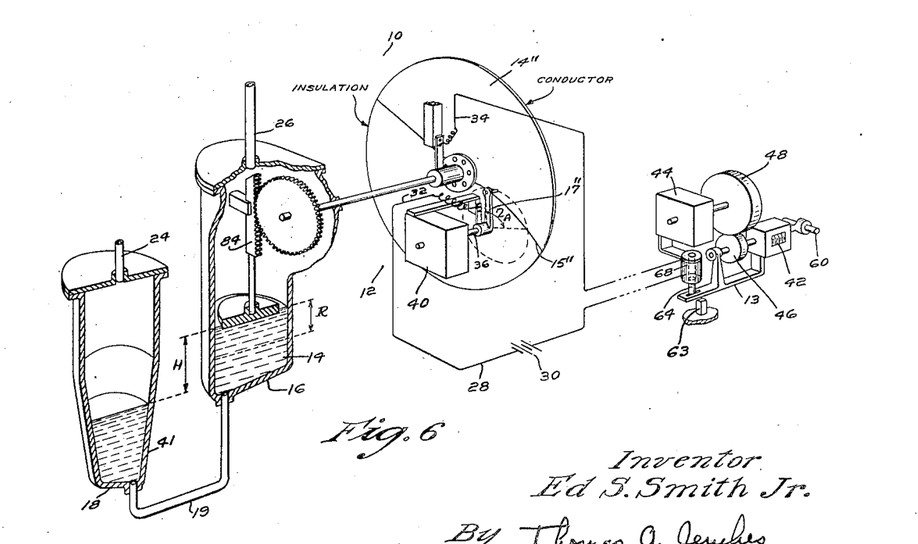
Fig. 6 is a diagrammatic perspective view of an embodiment of my invention generally similar to Fig. 5 wherein the contact line consists of a rotating plane solid contact surface.

The embodiments of my invention shown in Figs. 5 and 6 are generally similar to the embodiment of my invention shown in Fig. 2, the receiver 13 in each embodiment being exactly the same. The pivoted member 17 of the transmitter is also rotated by the clock or other rotating means 40, but the contact surface, instead of comprising the upper surface of a conducting fluid, comprises the edge 15' of insulated conducting solid surface 14' movable in a single plane in response to variations in the quantity. In this instance the displacement R of liquid 14 in the U-tube 19 revolves the driving cylinder 81 on which the continuous conveyor 82 is mounted through the medium of the rack mechanism 84 so as to move the contact edge 15 of said conductor 14 relative to said pivoted member 17' a distance R' in response to variations in the quantity to be metered. The device shown in Fig. 6 is substantially similar in functioning to the embodiment of my invention shown in Fig. 5 with the exception that the conductor 14" comprises a rotatable surface which is pivotally positioned into variable engagement with the pivoted member 17", rotated continuously by clock 40 for the desired intervals. These embodiments of my invention are particularly adapted for use in metering petroleum gas, liquid anhydrous ammonia or other fluids where it is highly desirable to avoid making electrical contacts within the fluid containing system.

Figure 7:
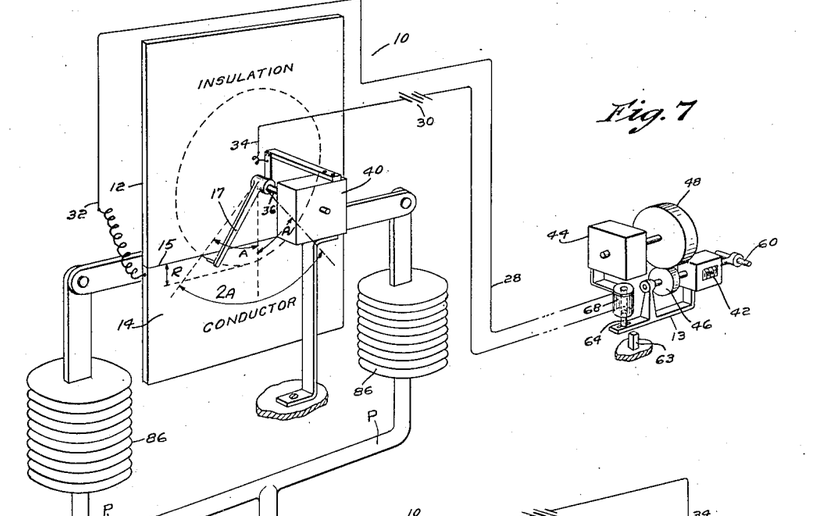
Fig. 7 is a perspective view of an embodiment of my invention employing the versed sine principle particularly adapted for metering absolute pressures in accordance with the versed-sine square-root relationship.

In Fig. 7 I have shown an embodiment of my invention substantially similar to that shown in Fig. 5, in which, however, the contact line 15 of the conducting surface 14 is moved a distance R proportional to the absolute pressure. The pressure comes in through the pipes P to the bellows 86 on opposite sides of said conductor 14 to raise the upper surface 15 of the conductor 14 in response to variations in pressure, the remaining portion of my invention being exactly similar to that shown in Fig. 5. It is obvious, however, that as shown in my Patent No. 2,003,839 heretofore referred to a telemetric device for recording the rate of flow may be provided, which device may be simultaneously actuated by or corrected for pressure by use of the multiplying device shown in that application. Thus the pressure differential and also the absolute pressure may be transmitted telemetrically to a distant multiplying device which functions in a manner explained in detail in that application.

The embodiment shown in Fig. 8 is generally similar to the embodiment of my invention shown in Fig. 2 employing, however, some of the features of the other embodiments. A transmitter 12 is exactly similar to that shown in Fig. 2 and the receiver 13 is somewhat similar to the type of recorder shown in Fig. 4. The rotating member 46 of the indicating means, however, is driven at constant speed by the same synchronous motor clock 44 which drives the recorder chart 66 through the medium of the belt or chain 90 which connects the pulley 92 mounted on the recorder driving shaft 94 with the pulley 96 mounted on a shaft 98 on which the gear 100 is mounted which drives the gear 102 mounted on the shaft 104 on which the driving disk 46 is mounted.

Whenever contact is formed in the circuit 28 the solenoid 66 is actuated to cause the armature 64 thereof to raise the lever 106 connected integrally with shafts 98 and 104 to pivot the driving disk 46 into driving engagement with the driven disk 108 mounted on the shaft 110. Engagement of the driving disk 46 with the driven disk 108 will operate to rotate the driven disk counter-clockwise in the direction of the arrow shown, to move the recorder arm 67 radially outwards over the rotating chart 66 and to move the indicator arm 38 over the scale 38' and simultaneously therewith to cause the pawl 112 thereof to engage with the ratchet 114 which in turn drives the counter mechanism 42.

It is thus obvious that when the driven disk 108 is rotated it will simultaneously function to move the recording arm 67 radially outwards over the continuously rotating recording chart 66, will move the indicating arm 38 relative to scale 38' and will cause through the medium of the pawl-ratchet connection 112—114 the integrating mechanism to be driven until suitable contact is broken in the electric circuit 28 thereby breaking contact in the solenoid 68 to permit the driving disk 46 to move out of contact with the driven disk 108 and to permit the weight 116 to rotate the driven disk 108 to bring the indicating and recording arms 38 and 67 respectively back to zero and to permit the pawl 112 to slide over the ratchet teeth 114 without affecting the position of the counter 42.

It is thus obvious that the receiver of this embodiment shows a combined indicating, recording and registering or counter mechanism. It is also obvious that in this embodiment the light 39 will flash out when contact is broken in the circuit 28, thereby giving opportunity for a visual reading of the position of the indicating arm 38 on the scale 38' leaving the actual reading of the indicating arm engraved on the retina so that its reading with high accuracy is an extremely simple matter. The chart record consists in drawing a line radially outwards over the chart to the actual rate and cyclically repeating it when current is again set up in the circuit 28, thus giving a series of radial lines on the recording chart 66. It is obvious that the accuracy of the chart recorder in no sense depends on the frequency of the cycles so long as the same frequency exists in both of the synchronous clocks 40 and 44 employed.

It is obvious, however, that the pivoted contact forming member connected either directly or indirectly with said circuit 28 may be pivotally mounted either as to itself contact directly or form contacts indirectly with said contact line 15 through an angle of pivoting movement of the contact former 17, the versed sine of which is proportional to the displacement of said contact line.

Figure 9:
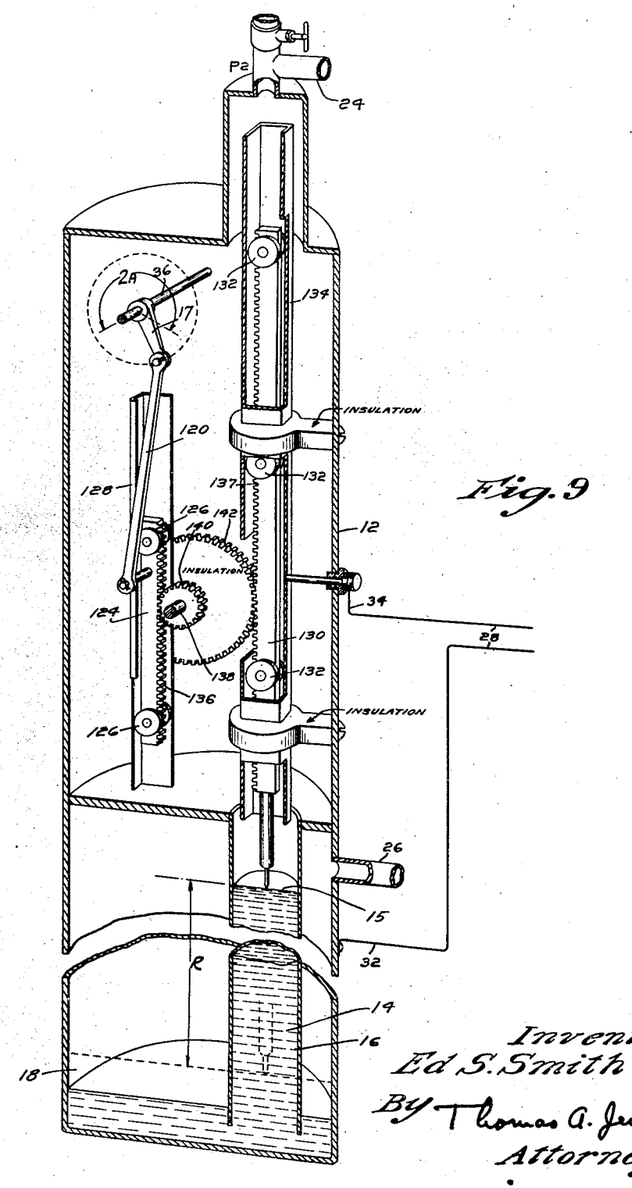
Fig. 9 is a diagrammatic sectional view of an alternative embodiment of the improved transmitting means of my invention in which the pivoted member continuously reciprocates the contact forming member in and out of contact with the contact line and in which the movement of the reciprocal contact forming member is considerably increased relative to the amount of pivoting movement of the pivoted contact former.

I have shown in Fig. 9 an embodiment of the transmitter of my invention which may be substituted for the transmitter 12 of my invention shown in Fig. 2 for cyclically transmitting flows of current corresponding to the versed-sine square-root relationship. In this embodiment of my invention the contact former 17 has a crank arm or crank which is pivoted or rotated at the desired speed and which has the connecting rod or pitman 120 connected to a portion thereof, preferably near an end thereof to operate a reciprocatable member 124 constrained to reciprocate in a single direction by the rollers 126 abutting the sides of an appropriate single plane guide way 128 and in the same plane as the center of the rotating or pivoting crank 17. Instead of having the contact forming means on the reciprocatable member 124, it is particularly desirable in designing small units to step up the movement between that of the pivotal movement of the contact former 17 to that of the actual contact forming member 130 and for this reason in this preferred embodiment the actual contact forming rod 130 has the rollers 132 attached thereto and is reciprocated in a cooperating guide way 134. Adjacent sides of the reciprocatable members 124 and 130 are provided with the rack teeth 136 and 137 respectively. The means to increase the movement of the contact forming rod 130 relative to the reciprocating rod 124 comprises the revolvable shaft 138 having mounted on one end thereof the relatively small gear 140 adapted to enmesh the teeth 136 in the rack 124 and the relatively large gear 142 adapted to enmesh the teeth 137 on the actual contact forming member 130. One end of the circuit 28 is connected as usual to the bottom of the U-tube and the other end is connected to the reciprocatable contact forming member 130 through the medium of the rollers 132 or in any other suitable fashion. It is thus obvious that the contact forming rod 130 will be reciprocated up and down to contact the contact line 15 and thus to sink within the conducting fluid 14 in amounts R which vary as the versed sine of the angle A of movement of the pivoted contact former or crank 17, increased in its reciprocatable movement, however, considerably over the relative movement of that member.

It is obvious, however, that if desired the step up gearing may be omitted and contact with said contact line 15 may be directly formed by means of the reciprocatable rod 124. In this embodiment of my invention it is obvious that the contact former 17 will pivot or rotate somewhat similarly to the crank arm of an engine, thereby causing, through the medium of the pitman or connecting rod 120, the contacting rod 124 or cooperating rod 130 which is moved thereby, either of which may be the actual contacting forming rod, to reciprocate in a single plane somewhat similar to the piston of an engine. It is thus obvious that this type of contact former 17 is connected indirectly with said circuit 28 and pivotally mounted so as to form a contact through the contact line 15 through an angle of pivoting movement of the contact former 17, which angle is substantially proportional to the square-root of the displacement of said contact line 15 without actually contacting it itself. It is also obvious that the instantaneous type of indicator shown in Fig. 1 may be modified to have the electric contact formed in similar manner.

It is understood that my invention is not limited to the specific embodiments shown and methods described and that various deviations may be therefrom without departing from the spirit and scope of the appended claims.

What I claim is:

1. In a meter for electrically indicating the square root of a quantity, in combination, a contact line displaceable substantially proportionately to said quantity, an electric circuit connected with said contact line, contact indicating means connected with said circuit, and a contact former connected with said circuit and pivotally mounted so as to form contact through said contact line through an angle of pivoting movement thereof, the versed sine of which is proportional to the displacement of said contact line, whereby said electrically indicated angle of contact may be substantially proportional to the square root of said quantity.

2. In a meter for electrically indicating the rate of flow of fluid in a conduit, in combination, a contact line displaceable substantially proportionately to the square of the rate of flow, an electric circuit connected with said contact line, contact indicating means connected with said circuit and a contact former connected with said circuit and pivotally mounted so as to form contact through the contact line through an angle of pivoting movement thereof, the versed sine of which is proportional to the displacement of said contact line, whereby through the medium of the versed sine square root relationship said indicating means may substantially indicate the rate of flow of fluid in said conduit.

3. In a meter for electrically indicating the square root of a quantity, in combination, a contact line displaceable substantially proportionately to said quantity, an electric circuit connected with said contact line, contact indicating means connected with said circuit, a contact former connected to said circuit and pivotally mounted so as to form contact through said contact line through an angle of pivoting thereof, the versed sine of which is proportional to the displacement of said contact line and means to modify the relation of the contact line to said quantity to cause said angle to follow the true square root relation of said quantity, whereby said contact indicating means may indicate proportionately to the square root of said quantity.

4. In a meter for electrically indicating the square root of a quantity, in combination, a conducting liquid surface displaceable substantially proportionately to said quantity, an electric circuit connected with said conducting liquid, and a contact former connected to said circuit and pivotally mounted so as to form a contact through said conducting liquid through an angle of pivoting movement thereof, the versed sine of which is proportional to the displacement of the surface of said conducting liquid, whereby said electrically indicating angle of contact may be substantially proportional to the square root of said quantity.

5. In a telemeter for electrically indicating the square root of a quantity, in combination, a contact line displaceable substantially proportionately to said quantity, an electric circuit connected with said contact line, contact indicating means connected with said circuit, a contact former connected with said circuit and pivotally mounted so as to form a contact through said contact line through an angle of pivoting movement thereof, the versed sine of which is proportional to the displacement of said contact line, and means to continuously rotate said pivoted contact former relative to said contact line to set up periodic currents in said circuit whose time duration is proportional to said angle, whereby said contact indicating means may indicate substantially proportionally to the square root of said quantity.

6. In a telemeter for electrically indicating the square root of a quantity, in combination, a contact line displaceable substantially proportionately to said quantity, an electric circuit connected with said contact line, a contactor connected with said circuit and pivotally mounted so as to contact said contact line through an angle, the versed sine of which is proportional to the displacement of said contact line, means to continuously rotate said pivoted contactor at a constant speed relative to said contact line to set up periodic currents in said circuit whose time duration varies as said angles of contact, movable indicating means, continuously rotating means at a constant speed in synchronism with said contactor rotating means and clutch means electrically actuated in response to the periodic currents in said circuit, to engage said movable indicating means with said continuously rotating means relative to the time duration of said periodic currents.

7. The method of telemetering which comprises displacing movable means in response to variations in a quantity, moving a contact former to contact with said movable means to set up in an electric circuit, flows of current of a time duration substantially proportional to the square root of said quantity and positioning a movable indicating member connected to said circuit by a function of the flows of said current, whereby the indication of said movable member substantially corresponds with the square root of said quantity.

8. The step in the method of telemetering a quantity, which comprises pivoting a member, moving a supplemental member in response to said quantity, setting up signal indications through an angle the versed sine of which is proportional to the displacement of said supplemental member, said signal indications corresponding to the time intervals of contact formed by said pivoted and movable members, whereby the time duration of said signal indications may vary as the angle of pivoting of said pivoting member during contact of said members, and hence substantially as the square root of said quantity.

9. The step in the method of telemetering a square root of a quantity, which comprises moving a pivoted member through a total angle, setting up indications by moving a supplemental member in response to said quantity into contact with said pivoted member through an angle, the versed sine of which is proportional to said quantity, whereby the proportion between said contact and total angles is indicative of the square root of said quantity.

10. A telemetering device comprising, in combination, a pivotally mounted member, and a supplemental member movable in response to a quantity to coact with said pivoted member through an angle the versed sine of which is proportional to said quantity.

11. In a telemeter, in combination, continuously movable means, a supplemental member movable in response to a quantity into contact with said continuously movable means to set up signal indications of a time duration proportionate to the square root of the quantity and means actuated by the contact of said member and means to periodically set up signal indications, the time interval of which varies as the time interval of contact of said member and means.

12. In a meter for electrically indicating the square root of a quantity, in combination, a contact surface having an edge displaceable substantially proportionately to said quantity, an electric circuit connected with said contact surface, contact indicating means connected to said circuit and a contactor connected to said circuit pivotally mounted so as to form contact through said edge of said contact surface through an angle of movement thereof, the versed sine of which is substantially proportional to the displacement of said edge, whereby said electrically indicated angle of contact may be substantially proportional to the square root of said quantity.

13. In a pressure responsive meter, a contact line displaceable substantially proportionally to said pressure, an electric circuit connected with said contact line, contact indicating means connected to said circuit and a contactor connected to said circuit pivotally mounted so as to form contact through said contact line through an angle of movement thereof, the versed sine of which is proportional to the displacement of said contact line, whereby said electrically indicating angle of contact may be substantially proportional to the square root of said pressure.

14. The step in the method of telemetering which comprises setting up in a transmitter flows of current of a time duration varying in accordance with the angle of coaction between a pivoted movable member and a member movable in response to a quantity, the versed sine of which angle is substantially proportional to said quantity.

15. The method of continuously telemetering the square root of a quantity, which comprises cyclically transforming successive values of said quantity into signals of time duration proportional to the respective square roots of said quantity and telemetrically transmitting said square root signals to a receiver.

16. The method of metering fluid flow rate which comprises cyclically setting up values corresponding to the square-root of successive values of a quantity variable with said flow rate, transmitting said values to a receiver and continuously averaging said transmitted values to indicate said flow rate.

17. In a meter for a variable proportional to the square-root of a quantity, in combination, a transmitter including means to cyclically set up and transmit successive values corresponding to the square root of said variable, and a receiver for receiving said transmitted values having means to average said values to indicate said variable.

18. In a meter for a variable proportional to a non-lineal function of a quantity, in combination, a transmitter including means to cyclically set up and transmit successive values corresponding to said quantity and proportional to said variable, and a receiver for receiving said transmitted values having means to average said values to indicate said quantity, including an electric circuit having a hot wire therein adapted to vary in length to indicate the average of said values to continuously indicate said variable.

19. In a meter for a variable proportional to a non-linear function to a quantity, in combination, a transmitter including means to cyclically set up and transmit successive values corresponding to said quantity and proportional to said variable, and a receiver for receiving said transmitted values having means therein thermally responsive to said transmitted values to continuously average them, to continuously indicate said variable.

20. In a meter for telemetrically indicating the square root of a quantity, in combination, positionable means displaceable substantially proportionately to said quantity, an electric circuit cooperating with said positionable means indicating means connected with said circuit, and a contact former connected to said circuit and mounted so as to move in respect to said positionable means to change the condition of said circuit in conjunction with said positionable means for a time interval substantially proportionate to the square root of the displacement of said positionable means.

21. In a meter for telemetrically indicating the square root of a quantity, in combination, positionable means displaceable substantially proportionately to said quantity, an electric circuit cooperating with said positionable means, contact indicating means connected with said circuit, a contact former connected to said circuit and mounted so as to move in respect to said positionable means to form a contact for a time interval substantially proportionate to the square root of the displacement of said positionable means and continuously movable means to cyclically operate said movable contact former in respect to said positionable means to form a contact to set up periodic currents in said circuit the time interval of which is proportional to the square root of said quantity.

22. In a meter for telemetrically indicating the square root of a quantity, in combination, a positionable means displaceable substantially proportionately to said quantity, an electric circuit cooperating with said positionable means, a contact former connected to said circuit and mounted so as to move in respect to said positionable means to form a contact for a time interval substantially proportionate to the square root of the displacement of said positionable means, means to cyclically move said movable contact former in respect to said positionable means to cooperate therewith to set up periodic currents in said circuit the time interval of which is proportional to the square root of said quantity, movable indicating means and means including a clutch electrically actuated in response to the periodic currents of said circuit to actuate said movable indicating means relative to the time duration of said periodic currents.

23. The method of telemetering, which comprises, displacing a positionable means in response to variations in a quantity, cyclically moving a contact former in respect to said positionable means to form a contact for a time interval substantially proportional to the square root of the displacement of said positionable means, to set up in an electric circuit flows of current of a time duration proportional to the square root of said quantity and positioning a movable indicating member connected to said circuit by a function of the flows of said current, whereby the indication of said movable member corresponds to the square root of said quantity.

24. In a telemetering device, in combination, a movable member and a supplemental movable member movable in response to a quantity into contact with said movable member for a time interval substantially proportional to the square root of said quantity.

25. The method of continuously telemetering the square root of the absolute pressure of a fluid flowing through a conduit which comprises cyclically transforming successive values of said absolute pressure into signals of time duration proportional to respective square roots of said values and telemetrically transmitting said square root signals to a distant receiver.

26. The method of telemetrically indicating the flow of fluid in a conduit which flow corresponds substantially to the square root of a quantity, said method comprising setting up a flow of current in an electric circuit of a time duration substantially proportionate to the square root of said quantity and moving a physical indicating member at a point of said circuit at a distance from said transmitting point in response to said flow of said current an amount proportional thereto.

27. In apparatus for telemetrically indicating the rate of flow of fluid through a conduit, differential pressure means responsive to the flow of said fluid, means positionable in response to said differential pressure, an electric circuit cooperating with said positionable means, indicating means connected with said circuit, and means comprising a contact controller connected to said circuit and cooperating with said positionable means for changing the condition of said circuit for a time interval proportionate to the square root of said differential pressure.

28. In apparatus for telemetrically indicating the rate of flow of fluid through a conduit, differential pressure means responsive to the flow of said fluid, means positionable in response to said differential pressure, an electric circuit cooperating with said positionable means, indicating means connected with said circuit, a contact controller, and means for causing said contact controller to move cyclically and to cooperate with said displaceable means in each of a succession of cyclical movements thereof for changing the condition of said circuit for a time interval proportionate to the square root of the differential pressure.

29. The method of telemetering, which comprises, producing within a fluid-containing chamber a signalling impulse of time duration corresponding with a variable, and transmitting said impulse to a point outside the chamber.

30. An apparatus responsive to a quantity, a fluid-containing chamber, means responsive to said quantity, time positioned means, contact means controlled thereby for a time duration dependent upon the position of said quantity responsive means, said means being within said fluid-containing chamber, constant speed driving means outside said chamber, and a shaft connected to said means and passing through a wall of said chamber.

31. The method of telemetering a total quantity depending upon the square root of a variable, which comprises, cyclically transforming successive values of said variable into signals of a function of time proportional to the respective square roots of said values, telemetrically transmitting said square root signals to a receiver and repeating said process to cyclically integrate said square root signals to thus obtain said total quantity.

32. The method of telemetering a total quantity depending upon the square root of a variable, which comprises, transforming said variable quantity into a signal having a time duration proportional to the square root thereof, telemetrically transmitting said square root signals to a receiver, and cyclically repeating said process to integrate said square roots to thus obtain said total quantity.

33. In a telemetric system for telemetering the square root of a quantity, a transmitter, a receiver, and a circuit connecting said transmitter with said receiver, said transmitter comprising means displaceable substantially proportionately to said quantity, motor means continuously operable at substantially constant speed, and means cyclically movable by said motor to form a contact with said displaceable means in each of a series of cycles for a time interval substantially proportionate to the square root of the displacement of said displaceable means, and said receiver comprising substantially constant speed motor means operable in approximate synchronism with said transmitter motor means and means actuated thereby in each of a series of cycles for the duration of said contact to cause an indication of said square root of said quantity.

34. In a telemetric system, a transmitter, a receiver and a circuit connecting said transmitter and receiver, said transmitter comprising a movable member displaceable in response to a quantity, motor means continuously operable at substantially constant speed, and a supplemental member movable by said motor means to produce with the first mentioned movable member a signal for a time interval substantially proportional to the square root of said quantity, and said receiver comprising means operable in approximate synchronism with said transmitter motor means for the duration of said signal.

35. The method of telemetering the square root of a quantity, which comprises transforming a value of said quantity into its square root by a mechanical movement, electrically converting said movement into a signal corresponding to said square root, and telemetrically transmitting said signal to a receiver.

36. The method of continuously telemetering the square root of a quantity, which comprises cyclically transforming successive values of said quantity into their respective square roots by mechanical movements, electrically converting said movements into signals corresponding to said square roots, and telemetrically transmitting said signals to a receiver.

ED S. SMITH, Jr.